United States Patent
Chakraborty

(10) Patent No.: US 11,257,496 B2
(45) Date of Patent: Feb. 22, 2022

(54) METHOD AND APPARATUS FOR FACILITATING PERSONA-BASED AGENT INTERACTIONS WITH ONLINE VISITORS

(71) Applicant: [24]7.ai, Inc., San Jose, CA (US)

(72) Inventor: Abir Chakraborty, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 45 days.

(21) Appl. No.: 16/583,530

(22) Filed: Sep. 26, 2019

(65) Prior Publication Data
US 2020/0098366 A1 Mar. 26, 2020

(30) Foreign Application Priority Data
Sep. 26, 2018 (IN) .............................. 201841036381

(51) Int. Cl.
| | |
|---|---|
| *G10L 15/22* | (2006.01) |
| *G06N 3/08* | (2006.01) |
| *G06N 3/04* | (2006.01) |
| *G06N 3/00* | (2006.01) |
| *G10L 15/06* | (2013.01) |
| *G10L 15/18* | (2013.01) |
| *G10L 25/63* | (2013.01) |
| *G10L 15/16* | (2006.01) |

(52) U.S. Cl.
CPC .............. *G10L 15/22* (2013.01); *G06N 3/004* (2013.01); *G06N 3/0445* (2013.01); *G06N 3/08* (2013.01); *G10L 15/063* (2013.01); *G10L 15/16* (2013.01); *G10L 15/1815* (2013.01); *G10L 25/63* (2013.01); *G10L 2015/223* (2013.01)

(58) Field of Classification Search
CPC ....... G10L 15/063; G10L 15/22; G10L 15/16; G10L 15/1815; G10L 25/63; G10L 2015/223; G06N 3/004; G06N 3/0445; G06N 3/08
See application file for complete search history.

(56) References Cited

U.S. PATENT DOCUMENTS 10,236,017 B1 * 3/2019 Witt-Ehsani .......... G06F 40/216
10,594,757 B1 * 3/2020 Shevchenko ......... H04L 65/605
(Continued)

*Primary Examiner* — Michael Colucci
(74) *Attorney, Agent, or Firm* — Perkins Coie LLP; Michael Glenn

(57) ABSTRACT

A method and apparatus for facilitating persona-based agent interactions with online visitors is disclosed. A plurality of persona related attributes is extracted from a textual transcript of each interaction between an agent of an enterprise and an online visitor. A feature vector data representation is generated based on the plurality of persona related attributes extracted from each interaction to configure a plurality of feature vector data representations. The plurality of feature vector data representations is classified based on a plurality of persona-based clusters, which enables classification of the plurality of online visitors into the plurality of persona-based clusters. A learning model is trained for each persona-based cluster using utterances of online visitors classified into a respective persona-based cluster. The learning model is trained to mimic a visitor persona representative of the respective persona-based cluster. The trained learning model is configured to facilitate the persona-based agent interactions with the online visitors.

20 Claims, 8 Drawing Sheets

(56) References Cited

U.S. PATENT DOCUMENTS

| | | | |
|---|---|---|---|
| 2004/0006476 A1* | 1/2004 | Chiu | H04M 3/4936 |
| | | | 704/270.1 |
| 2014/0359439 A1* | 12/2014 | Lyren | G06F 16/951 |
| | | | 715/705 |
| 2018/0060301 A1* | 3/2018 | Li | G06N 3/08 |
| 2018/0253662 A1* | 9/2018 | Booch | G06N 20/00 |
| 2018/0261203 A1* | 9/2018 | Zoller | H04L 51/02 |
| 2018/0374000 A1* | 12/2018 | Herzig | G06N 5/04 |
| 2019/0095428 A1* | 3/2019 | Asano | G10L 15/1822 |
| 2019/0238487 A1* | 8/2019 | Ciano | G06N 20/00 |
| 2019/0272547 A1* | 9/2019 | Coman | G06N 3/08 |
| 2020/0004874 A1* | 1/2020 | Gupta | G10L 15/22 |
| 2020/0005118 A1* | 1/2020 | Chen | G06N 3/006 |
| 2020/0160199 A1* | 5/2020 | Al Hasan | G06F 16/90332 |

\* cited by examiner

METHOD AND APPARATUS FOR FACILITATING PERSONA-BASED AGENT INTERACTIONS WITH ONLINE VISITORS

CROSS REFERENCE TO RELATED APPLICATIONS

This application claims priority to provisional patent application No. 201841036381 filed in India on Sep. 26, 2018, which is incorporated herein in its entirety by this reference thereto.

TECHNICAL FIELD

The present technology generally relates to solutions facilitating interactions between online visitors and agents of an enterprise and, more particularly, to a method and apparatus for facilitating persona-based agent interactions with the online visitors to improve visitor interaction experiences.

BACKGROUND

Online enterprise channels, such as the enterprise Website and enterprise social media portals, display enterprise products and/or services and routinely attract many visitors. Existing or potential customers of the enterprise visiting the online enterprise channels are referred to herein as online visitors. The enterprises attempt to engage with the online visitors and, in general, provide an enriched experience to the online visitors to enhance chances of sale or to improve the likelihood of the online visitors visiting the online enterprise channels again.

Currently, an appropriate treatment for an online visitor is determined based on the online visitor's attributes. For example, an intention of the online visitor to make a purchase on the Website or to click on an advertisement (also referred to herein as 'Ad') during the visitor's current visit to the Website is predicted based on the visitor's attributes, such as current and past journeys on the Website, device used for accessing the Website, current visitor location, and the like. If it is determined that the online visitor will perform the desired action, then an appropriate treatment such as an offer to chat with a customer support representative of an enterprise may be selected and offered to the online visitor during the ongoing visit to the enterprise Website. Such treatment is provided to the online visitor to influence the online visitor to take certain desired action, such as for example, to click on an Ad, to engage in a purchase transaction, and the like.

The online visitors who accept the offer to chat with enterprise customer support representatives (hereinafter referred to as an 'agent') may be associated with different personas and, as such, a standard treatment for all online visitors may be counterproductive. In an illustrative example, one online visitor may be associated with a 'convenience customer' persona, implying that the online visitor seeks quick resolution to issues. If such a visitor were to be routed to an agent, who is trained to ask a lot of questions and seek visitor confirmation at every stage, then the visitor interaction experience may get ruined on account of the delay in resolving the issue. In another illustrative example, one online visitor may be associated with a 'deal-seeker' persona implying that the online visitor seeks discounts or promotional offers on purchase transactions. Accordingly, if such an online visitor were to be routed to an agent, who is trained to sell only low value goods, which are typically not associated with offers or discounts, then the visitor interaction experience may get ruined. In some cases, the online visitor may abandon the interaction, perhaps never to return.

Accordingly, there is a need to provide improved interaction experience to the online visitors. Further, it would be advantageous to train conversational agents to interact with online visitors associated with different personas so as to provide improved interaction experience to the online visitors.

SUMMARY

In one embodiment, a computer-implemented method for facilitating persona-based agent interactions with online visitors is disclosed. The method extracts, by a processor, a plurality of persona related attributes from a textual transcript of each interaction from among a plurality of interactions between agents of an enterprise and a plurality of online visitors visiting enterprise interaction channels. The plurality of persona related attributes is extracted from each interaction in relation to a persona of an online visitor engaged in the respective interaction. The method generates, by the processor, a feature vector data representation based, at least in part, on the plurality of persona related attributes extracted from each interaction. The generation of the feature vector data representation in relation to each interaction from among the plurality of interactions configures a plurality of feature vector data representations. The method, classifies, by the processor, the plurality of feature vector data representations based on a plurality of persona-based clusters. The classification of the plurality of feature vector data representations based on the plurality of persona-based clusters enables classification of the plurality of online visitors into the plurality of persona-based clusters. For each persona-based cluster from among the plurality of persona-based clusters, the method trains, by the processor, a learning model using utterances of online visitors classified into a respective persona-based cluster. The learning model is trained to mimic a visitor persona representative of the respective persona-based cluster. The trained learning model is configured to facilitate the persona-based agent interactions.

In another embodiment, an apparatus for facilitating persona-based agent interactions with online visitors is disclosed. The apparatus includes a processor and a memory. The memory stores instructions. The processor is configured to execute the instructions and thereby cause the apparatus to extract a plurality of persona related attributes from a textual transcript of each interaction from among a plurality of interactions between agents of an enterprise and a plurality of online visitors visiting enterprise interaction channels. The plurality of persona related attributes is extracted from each interaction in relation to a persona of an online visitor engaged in the respective interaction. The apparatus generates a feature vector data representation based, at least in part, on the plurality of persona related attributes extracted from each interaction. The generation of the feature vector data representation in relation to each interaction from among the plurality of interactions configures a plurality of a feature vector data representations. The apparatus classifies the plurality of a feature vector data representations based on a plurality of persona-based clusters. The classification of the plurality of a feature vector data representations based on the plurality of persona-based clusters enables classification of the plurality of online visitors into the plurality of persona-based clusters. For each persona-based cluster from among the plurality of persona-based clusters, the apparatus trains a learning model using utterances of online visitors classified into a respective persona-based cluster. The learning model is trained to mimic a visitor persona representative of the respective persona-based cluster. The trained learning model is configured to facilitate the persona-based agent interactions.

In yet another embodiment, a computer-implemented method for facilitating persona-based agent interactions with online visitors is disclosed. The method performs, by a processor, for each interaction from among a plurality of interactions between agents of an enterprise and a plurality of online visitors visiting enterprise interaction channels: (1) extract a plurality of utterances of an online visitor from a textual transcript of a respective interaction, and (2) for each utterance from among the plurality of utterances, perform a predefined personality trait evaluation to extract a plurality of persona related attributes. The plurality of persona related attributes is extracted from each interaction in relation to a persona of the online visitor engaged in the respective interaction. The method generates, by the processor, a feature vector data representation based, at least in part, on the plurality of persona related attributes extracted from each interaction. The generation of the feature vector data representation in relation to each interaction from among the plurality of interactions configures a plurality of feature vector data representations. The method classifies, by the processor, the plurality of feature vector data representations based on a plurality of persona-based clusters. The classification of the plurality of feature vector data representations based on the plurality of persona-based clusters enables classification of the plurality of online visitors into the plurality of persona-based clusters. For each persona-based cluster from among the plurality of persona-based clusters, the method trains, by the processor, a Recurrent Neural Network (RNN) model using utterances of online visitors classified into a respective persona-based cluster. The RNN model is trained to mimic a visitor persona representative of the respective persona-based cluster. The trained learning model is configured to facilitate the persona-based agent interactions.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
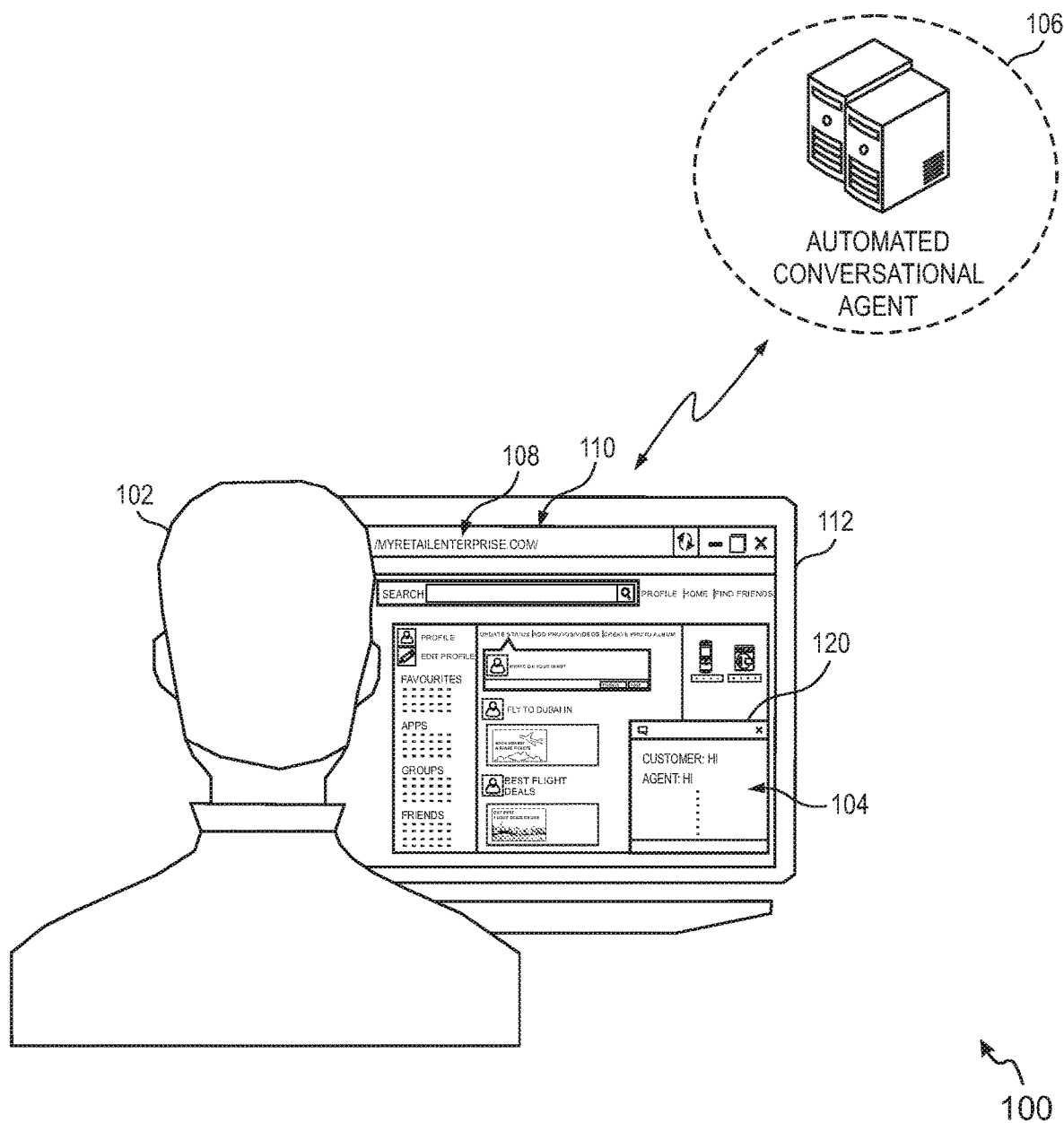
FIG. 1 shows a representation of a customer engaged in a chat conversation with an automated conversational agent of an enterprise, in accordance with an example scenario.

FIG. 1 shows a representation 100 of a customer 102 engaged in a chat conversation 104 with an automated conversational agent 106 of an enterprise, in accordance with an example scenario. The term 'enterprise' as used throughout the description may refer to a corporation, an institution or a small/medium sized company. For example, the enterprise may be a banking enterprise, an educational institution, a financial trading enterprise, an aviation company, a consumer goods enterprise or any such public or private sector enterprise. It is understood that the enterprise may be associated with potential and existing users of products, services and/or information offered by the enterprise. Such existing or potential users of enterprise offerings are referred to herein as customers of the enterprise. The representation 100 depicts one example customer of the enterprise as the customer 102 for illustration purposes.

Most enterprises, nowadays, extend dedicated customer support facility to their customers. A typical customer support center may include a number of customer service representatives, such as live agents, automated conversational agents and self-assist systems, such as either Web or mobile digital self-service, and/or Interactive Voice Response (IVR) systems. The customer support representatives are trained to interact with the customers for providing information to the customers, selling to them, answering their queries, addressing their concerns, and/or resolving their issues. The representation 100 depicts one example customer support representative associated with the enterprise as the automated conversational agent 106. The automated conversational agent 106 may be deployed in a remote customer support center (not shown in FIG. 1). It is noted that for purposes of the description, the live agents and the automated conversational agents are collectively referred to as 'conversational agents' or 'agents'. Moreover, the automated conversational agents are also referred to herein as 'virtual agents' or 'chatbots' or simply as 'bots'.

In an illustrative scenario, the customer 102 may access a website 108 using a Web browser application 110 installed on a personal electronic device 112 (exemplarily depicted to be a desktop computer). The website 108 may be hosted on a remote Web server and the Web browser application 110 may be configured to retrieve one or more Web pages associated with the website 108 from the remote Web server over a communication network (not shown in FIG. 1). An example of the communication network may include the Internet. It is understood that the website 108 may attract a large number of existing and potential customers, such as the customer 102. The customer 102, on account of accessing an online enterprise interaction channel (i.e. the website 108), is hereinafter referred to as an online visitor 102.

In the representation 100, the website 108 is exemplarily depicted to be an E-commerce website displaying a variety of products and services for sale to online visitors during their journey on the website 108. It is noted that the term 'journey' as used throughout the description refers to a path an online visitor, such as the online visitor 102, may take to reach his/her goal when using a particular interaction channel. For example, the online visitor's journey on the website 108 may include several Web page visits and decision points that carry the online interaction of the online visitor 102 from one step to another step.

In an example scenario, an activity of the online visitor 102 on the website 108 during the journey of the online visitor 102 on the website 108 may be tracked and the tracked information along with other information, such as past activity on the website 108, previous chat conversations with agents, type of device/browser/OS used for accessing the website 108, and the like, may be used to determine an intention of the online visitor 102. For example, an intention of the online visitor 102 to perform a desired action, such as make a purchase transaction on the website 108 or click on a banner advertisement may be determined. If it is determined that the online visitor 102 will perform the desired action, then an appropriate treatment such as an offer to chat with an agent of an enterprise or an offer to speak with a customer support representative like a human agent or the automated conversational agent 106 may be selected and provided to the online visitor 102. In an illustrative example, a widget displaying text 'Need Assistance, Talk to our Agent!!' may be displayed on the current UI of the website 108. A selection input on the widget by the online visitor 102 may cause a chat console, such as the chat console 120 to pop up, for facilitating the chat conversation 104 between the online visitor 102 and the automated conversational agent 106.

It is noted that in some example scenarios, the online visitor 102 may also call a customer care number displayed on the website 108 and connect with a conversational agent (such as the live agent or an interactive voice response (IVR) system) to seek assistance from the conversational agent. It is understood that the conversation may be embodied as voice conversation in such a scenario.

In many example scenarios, the conversational agents may not be trained to handle online visitors with different personalities (i.e. personas). For example, the automated conversational agent 106, though trained in the relevant technology/service area may not be trained to handle agitated online visitors. Accordingly, if an agitated visitor were to be routed to the automated conversational agent 106, who is not trained to handle an agitated visitor, then the response by the automated conversational agent 106 to the visitor may not soothe or pacify the visitor's concerns and, in fact, may ruin an interaction experience of the online visitor 102. In some cases, the online visitor 102 may abandon the interaction altogether.

Various embodiments of the present technology provide a method and apparatus that are capable of overcoming these and other obstacles and providing additional benefits. More specifically, various embodiments of the present invention disclose a method and apparatus for training of conversational agents to enable the conversational agents to handle visitor interactions involving various visitor personas. More specifically, embodiments disclosed herein enable creation of models using deep learning Neural Network (NN) that learns an efficient representation of the previous utterances as a context and uses it in subsequent reply generation. More specifically, the models are trained to incorporate persona in automated conversational agents (also referred to herein as chatbots). Incorporating persona in automated conversational agents may be beneficial in two different ways. An automated conversational agent mimicking visitors' persona may be used for live agent training since different visitors have different personalities and even for similar issues can react differently, while chatting with live agents. For example, some visitors may be lenient and patient while some visitors can be highly demanding. Persona-based agent training will equip live agents to handle online visitors in an efficient manner. Similarly, a live agent's persona may be incorporated in an automated conversational agent and such a trained automated conversational agent may be used for greater compatibility while conversing with a visitor with known personality traits.

An apparatus for facilitating persona-based agent interactions with the online visitors is explained with reference to FIG. 2.

Figure 2:
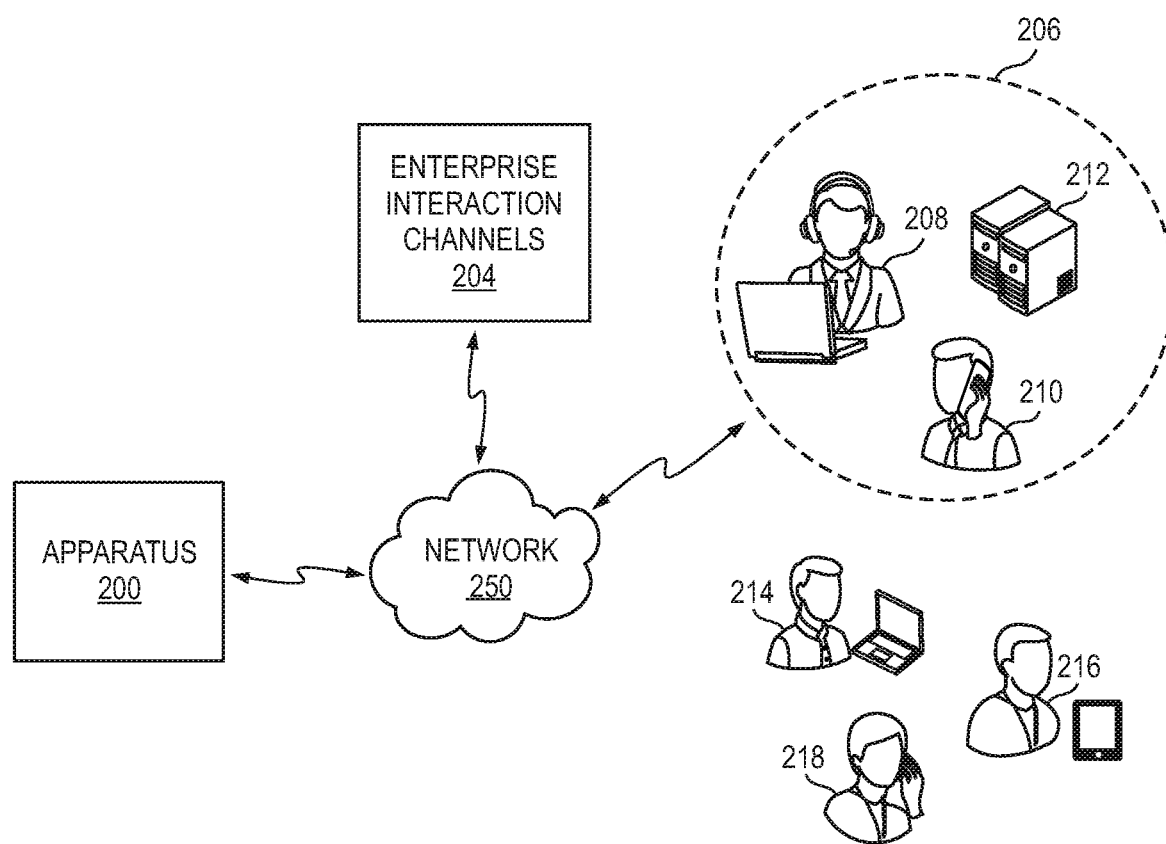
FIG. 2 is a representation showing an apparatus configured to facilitate persona-based agent interactions with online visitors, in accordance with an embodiment of the invention.

FIG. 2 is a representation showing an apparatus 200 configured to facilitate persona-based agent interactions with online visitors, in accordance with an embodiment of the invention. The term 'facilitating persona-based agent interactions' as used herein implies enabling conversational agents, i.e. live agents or automated conversational agents, to handle interactions with online visitors with different personas. More specifically, the term 'facilitating persona-based agent interactions' as used herein implies providing training to conversational agents to handle different personas of online visitors so as to provide the best possible interaction experience to the online visitors. For example, if an online visitor is aggressive or extremely angry, then the agent is trained to first soothe or pacify the online visitor and thereafter work towards resolution of the concern of the online visitor in an expeditious manner. In another illustrative example, if an online visitor is disappointed with an enterprise service, then the agent is trained to cheer the online visitor, for example by offering promotional offers or discount coupons, and the like.

In FIG. 2, the apparatus 200 is exemplarily depicted as a block in the representation. Moreover, the apparatus 200 is depicted to be in operative communication with a plurality of remote entities. In at least one example embodiment, the apparatus 200 is embodied as an interaction platform including a set of software layers on top of existing hardware systems. The apparatus 200 is configured to connect to a communication network, such as a network 250. The network 250 may be embodied as a wired communication network (for example, Ethernet, local area network (LAN), etc.), a wireless communication network (for example, a cellular network, a wireless LAN, etc.) or a combination thereof (for example, the Internet).

Using the network 250, the apparatus 200 is configured to be in operative communication with various enterprise interaction channels 204. Most enterprises, nowadays, offer various options to its customers to interact with the enterprise. For example, an enterprise may provide a website or a Web portal, i.e. a Web channel, to enable the customers to locate products/services of interest, to receive information about the products/services, to make payments, to lodge complaints, and the like. In another illustrative example, an enterprise may offer automated conversational agents to interact with the customers and enable self-service. In yet another illustrative example, an enterprise may offer dedicated customer sales and service representatives, such as live agents and automated conversational agents, to interact with the customers by engaging in voice conversations, i.e. use a speech interaction channel, and/or chat conversations, i.e. use a chat interaction channel. Similarly, the enterprises may offer other interaction channels such as an Email channel, a social media channel, a native mobile application channel, and the like.

In the representation shown in FIG. 2, a customer support facility 206 including human resources and machine-based resources for facilitating customer interactions, is depicted. More specifically, the customer support facility 206 is exemplarily depicted to include two live agents 208 and 210 (who provide online visitors with chat-based/online assistance and voice-based assistance, respectively) and an automated conversational agent 212 (which may be similar to the automated conversational agent 106 shown in FIG. 1) capable of offering customers with IVR/chat-based assistance. It is understood that the customer support facility 206 may also include other Web or digital self-assist mechanisms. Moreover, it is noted that the customer support facility 206 is depicted to include only two live agents 208 and 210 and the automated conversational agent 212 for illustration purposes and it is understood that the customer support facility 206 may include fewer or more number of resources than those depicted in FIG. 2.

The representation further depicts a plurality of customers, such as a customer 214, a customer 216 and a customer 218. The term 'customers' as used herein includes both existing customers as well as potential customers of information, products and services offered by the enterprise. Moreover, the term 'customer' of the enterprise may include individuals, groups of individuals, other organizational entities etc. It is understood that three customers are depicted in FIG. 2 for example purposes and that the enterprise may be associated with many such customers. In some example scenarios, the customers 214, 216 and 218 may browse the Website and/or interact with the resources deployed at the customer support facility 206 over the network 250 using their respective electronic devices. Examples of such electronic devices may include mobile phones, smartphones, laptops, personal computers, tablet computers, personal digital assistants, smart watches, web-enabled wearable devices and the like. The customers, such as the customer 214 and 216, which visit online enterprise interaction channels are referred to herein as online visitors.

The apparatus 200 is configured to be in operative communication with the customer support facility 206 through the network 250. More specifically, the apparatus 200 may be in operative communication with devices of live agents, with automated conversational agents, and/or with server mechanisms monitoring the electronic devices deployed at the customer support facility 206 through the network 250. In at least one example embodiment, on account of such operative communication, the apparatus 200 may be configured to track availability of the agent in substantially real-time. Moreover, in some embodiments, the apparatus 200 may also receive transcripts of conversations between the conversational agents and the online visitors in substantially real-time.

The apparatus 200 is further configured to be in operative communication with devices of the customers (including the online visitors). For example, the apparatus 200 may be configured to be in operative communication with the enterprise native mobile applications installed in the devices of the online visitors and also with related applications, such as Virtual Assistants (VAs) deployed in the devices of the customers.

The apparatus 200 is configured to facilitate persona-based agent interactions with online visitors. The effecting of persona-based agent interactions with online visitors is further explained in detail with reference to various components of the apparatus 200 in FIG. 3.

Figures 3, 4:
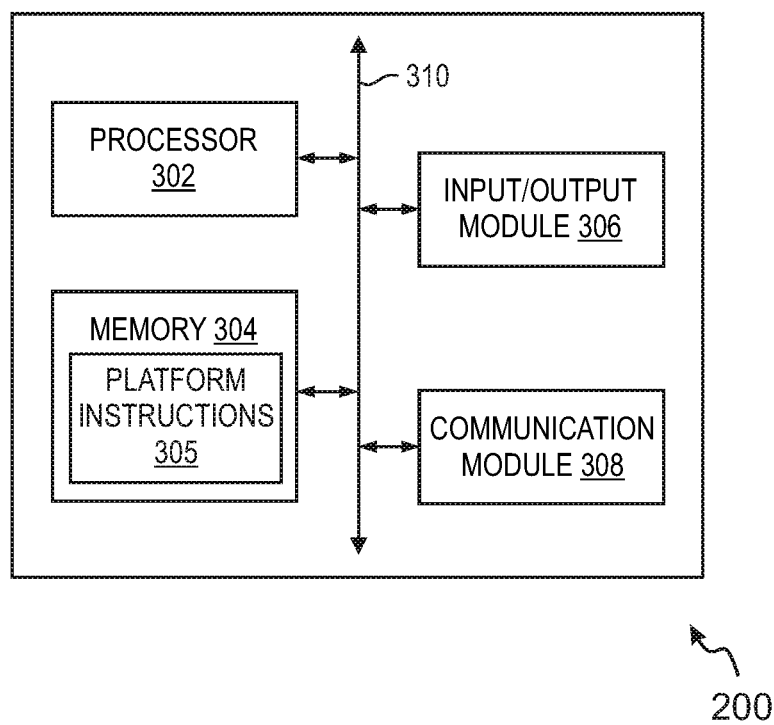
FIG. 3 is a block diagram of the apparatus of FIG. 2, in accordance with an embodiment of the invention.
FIG. 4 is a simplified representation of a table for illustrating feature vector data representations generated corresponding to the plurality of visitors, in accordance with an embodiment of the invention.

FIG. 3 is a block diagram of the apparatus 200 of FIG. 2, in accordance with an embodiment of the invention. As explained with reference to FIG. 2, the apparatus 200 may be embodied as an interaction platform with one or more components of the apparatus 200 implemented as a set of software layers on top of existing hardware systems. The interaction platform is configured to engage in bi-directional communication with enterprise interaction channels and/or data gathering Web servers linked to the enterprise interaction channels over a communication network (such as the network 250 shown in FIG. 2). For example, the interaction platform may communicate with the data gathering Web servers to receive information related to online visitor interactions, such as online visitor chat interactions or voice interactions, in an on-going manner in real-time. Further as explained with reference to FIG. 2, the interaction platform may also be capable of engaging in operative communication with personal devices of the online visitors and configured to receive information related to visitor-enterprise interactions from the personal devices of the online visitors.

The apparatus 200 includes at least one processor, such as a processor 302 and a memory 304. It is noted that although the apparatus 200 is depicted to include only one processor, the apparatus 200 may include more number of processors therein. In an embodiment, the memory 304 is capable of storing machine executable instructions, referred to herein as platform instructions 305. Further, the processor 302 is capable of executing the platform instructions 305. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 304 is configured to store logic and instructions for facilitating conversion of voice conversations to a textual form. For example, the memory 304 may store instructions/logic for Automatic Speech Recognition (ASR) and Natural Language Processing (NLP) techniques using special grammar (i.e. domain vocabulary) to facilitate textual transcription of voice conversations.

The memory 304 also stores instructions related to Recurrent Neural Network (RNN) models capable of facilitating RNN based encoding and decoding of utterances associated with the interactions. Some non-limiting examples of such RNN models include, but are not limited to, Long Short-Term Memory (LSTM), Gated Recurrent Unit (GRU) and Bi-directional RNN. It is noted that an RNN model trained using encoding logic, in effect, configures an RNN based encoder, whereas an RNN model trained using decoding logic, in effect, configures an RNN based decoder.

The memory 304 further stores at least one clustering algorithm from among K-means algorithm, a self-organizing map (SOM) based algorithm, a self-organizing feature map (SOFM) based algorithm, a density-based spatial clustering algorithm, an optics clustering based algorithm and the like, for facilitating clustering of feature vector data representations as will be explained in further detail later. Furthermore, the memory 304 may also store instructions for computing similarity or dissimilarity between vector representations. For example, the memory 304 may store instructions related to computation of dissimilarity measures such as optimal matching, longest common subsequence, longest common prefix, hamming distance, and the like.

The memory 304 may also be configured to store text mining and intention prediction models as classifiers. Some examples of classifiers include models based on Logistic Regression (LR), Artificial Neural Network (ANN), Support Vector Machine (SVM) with Platt scaling, and the like. The classifiers may be used to predict intention of each online visitor for requesting an interaction with the agent.

In at least some embodiments, the memory 304 may include a database (not shown in FIG. 3) configured to store raw data related to interactions between the agents and the visitors. The database may also store textual transcripts corresponding to the stored interactions. Further, the database may store information related to workflows extracted from interactions and the workflow groups associated with interactions, which are clustered or categorized based on similarity in associated workflows.

The apparatus 200 also includes an input/output module 306 (hereinafter referred to as an 'I/O module 306') and at least one communication module such as a communication module 308. The I/O module 306 includes mechanisms configured to receive inputs from and provide outputs to the user of the apparatus 200. The term 'user of the apparatus 200' as used herein refers to any individual or groups of individuals assigned with operating the apparatus 200 for facilitating persona-based agent interactions with online visitors. In an illustrative example, an enterprise may employ several data scientists, Machine Learning (ML) and/or Artificial Intelligence (AI) analysts, Information Technology (IT) professionals, scientists and researchers for configuring and operating the apparatus 200 embodied as an interaction platform. In an illustrative example, the I/O module 306 may enable the user of the apparatus 200 to define various workflow stages to facilitate persona-based agent interactions with online visitors. In another illustrative example, the I/O module 306 may enable the user of the apparatus 200 to feed/input information related to agents, such as agent domain specialization for instance, to enable routing of interaction requests from online visitors to appropriate agents within a customer support facility. To provide such inputs and view corresponding outputs, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302.

The communication module 308 is configured to facilitate communication between the apparatus 200 and one or more remote entities over a communication network, such as the network 250 explained with reference to FIG. 2. For example, the communication module 308 may enable communication between the apparatus 200 and customer support facilities, such as the customer support facility 206 shown in FIG. 2. In an illustrative example, the communication module 308 receives information related to voice or chat interactions between online visitors and conversational agents being conducted using various interaction channels, in real-time and provides the information to the processor 302.

To that effect, the communication module 308 may include several channel interfaces to receive information from a plurality of enterprise interaction channels. In at least some embodiments, the communication module 308 may include relevant Application Programming Interfaces (APIs) to communicate with remote data gathering servers associated with such enterprise interaction channels over the network 250. Each channel interface may further be associated with a respective communication circuitry such as for example, a transceiver circuitry including antenna and other communication media interfaces to connect to the network 250. The communication circuitry associated with each channel interface may, in at least some example embodiments, enable transmission of data signals and/or reception of signals from remote network entities, such as Web servers hosting enterprise Website or a server at a customer support facility configured to maintain real-time information related to interactions between online visitors and conversational agents.

In some embodiments, the information may also be collated from the plurality of devices utilized by the online visitors. To that effect, the communication module 308 may be in operative communication with various online visitor touch points, such as electronic devices associated with the online visitors, websites visited by the online visitors, devices used by customer support representatives (for example, voice agents, chat agents, IVR systems, in-store agents, and the like) engaged by the online visitors, and the like. In an embodiment, the visitor information extracted from various online visitor touch points includes profile data and journey data corresponding to the respective online visitor. The profile data may include profile information related to the online visitor, such as for example, an online visitor's name and contact details, information related to products and services associated with the online visitor, social media account information, information related to other messaging or sharing platforms used by the online visitor, recent transactions, online visitor interests and preferences, online visitor's credit history, history of bill payments, credit score, memberships, history of travel, and the like. In some exemplary embodiments, the visitor information may also include calendar information associated with the online visitor. For example, the calendar information may include information related to an availability of the online visitor during the duration of the day/week/month.

In an embodiment, journey data received corresponding to the online visitor may include information such as enterprise related web pages visited, queries entered, chat entries, purchases made, exit points from websites visited, or decisions made, mobile screens touched, work flow steps completed, sequence of steps taken, engagement time, IVR speech nodes touched, IVR prompts heard, widgets/screens/buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, information, answers, actions given/performed by either enterprise system or agents for the customer, and the like. In some example scenarios, the journey data may include information related to past interactions of the online visitor with resources at a customer support facility, the types of channels used for interactions, customer channel preferences, types of visitor issues involved, whether the issues were resolved or not, the frequency of interactions and the like.

The channel interfaces of the communication module 308 may be configured to receive such information related to the online visitors in real-time or on a periodic basis. Moreover, the information may be received by the communication module 308 in an online mode or an offline mode. In an embodiment, the communication module 308 provides the received information to the database in the memory 304 for storage purposes. In an embodiment, the information related to each customer is labeled with some customer identification information (for example, a customer name, a unique ID and the like) prior to storing the information in the database.

In an embodiment, various components of the apparatus 200, such as the processor 302, the memory 304, the I/O module 306 and the communication module 308 are configured to communicate with each other via or through a centralized circuit system 310. The centralized circuit system 310 may be various devices configured to, among other things, provide or enable communication between the components (302-308) of the apparatus 200. In certain embodiments, the centralized circuit system 310 may be a central printed circuit board (PCB) such as a motherboard, a main board, a system board, or a logic board. The centralized circuit system 310 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 3. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to facilitate training of conversational agents of an enterprise. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as online visitor's devices. In another embodiment, the apparatus 200 may be a central system that is shared by or accessible to each of such devices.

As explained with reference to FIG. 1, online visitors to the enterprise interaction channels may seek interaction with agents for several reasons. The term 'interaction', as explained with reference to FIG. 1, may correspond to a chat conversation or a voice conversation between a conversational agent and an online visitor visiting (i.e. accessing) an enterprise interaction channel. The conversational agent may be a live agent (i.e. a human agent) or an automated agent (for example, a chatbot).

The apparatus 200 is configured to facilitate interactions between agents and the online visitors by diverting the requests for interactions received from the online visitors to appropriate agents. A plurality of such interactions between the agents and the online visitors may be conducted over a chat medium or a voice medium. More specifically, the plurality of interactions includes voice interactions and textual chat interactions between the agents and the online visitors.

In one embodiment, the content of the textual chat interactions may be received by the communication module 308 from Web/Data gathering servers located at the customer support center. The communication module 308 may be configured to relay the information to the processor 302. The processor 302 is configured to store the content of each textual chat interaction as a textual transcript in the database associated with the memory 304 of the apparatus 200.

Some interactions between visitors and conversational agents may be conducted in a speech form and, in such scenarios, recorded voice interactions may be sent by the Web/Data gathering servers to the communication module 308. The communication module 308 may be configured to relay the information to the processor 302. The recorded voice interactions may be converted into a textual form by the processor 302 using Automatic Speech Recognition (ASR) and Natural Language Processing (NLP) techniques using special grammar stored in the memory 304. The processor 302 may further be configured to store the textual content of each voice interaction as a textual transcript in the database associated with the apparatus 200. To summarize, the content of each interaction between an agent and an online visitor is stored as a textual transcript in the database associated with the apparatus 200.

Accordingly, a plurality of textual transcripts may be generated corresponding to a plurality of interactions between agents of an enterprise and online visitors visiting the enterprise interaction channels. For purposes of this description, the term 'plurality of interactions' as used herein implies any number of interactions conducted within a predefined period (for example, a week, a month, a year and so on and so forth). In an illustrative example, the user of the apparatus 200 may decide to choose interactions conducted within the last three months as content material for training of agents to facilitate persona-based agent interactions. Accordingly, the plurality of interactions, in such a case, may imply all interactions conducted within the specified three-month period.

In at least one example embodiment, the processor 302 in conjunction with the instructions in the memory 304, is configured to cause the apparatus 200 to extract a plurality of persona related attributes from a textual transcript of each interaction. The plurality of persona related attributes is extracted in relation to a persona of an online visitor engaged in the respective interaction. The term 'persona' refers to characteristics reflecting behavioral patterns, goals, motives and personal values of the online visitor. It is noted that 'personas' as used herein is distinct from the concept of user profiles, that are classically used in various kinds of analytics, where similar groups of online visitors are identified based on certain commonality in their attributes, which may not necessarily reflect behavioral similarity, or similarity in goals and motives. An example of an online visitor persona type may be a 'convenience customer' that corresponds to a group of online visitors characterized by the behavioral trait that they are focused and are looking for expeditious delivery of service. In an embodiment, a behavioral trait as referred to herein corresponds to a biological, sociological or a psychological characteristic. An example of a psychological characteristic may be a degree of decidedness associated with an online visitor while making a purchase. For example, some online visitors dither for a long time and check out various options multiple times before making a purchase, whereas some online visitors are more decided in their purchasing options. An example of a sociological characteristic may correspond to a likelihood measure of an online visitor to socialize a negative sentiment or an experience. For example, an online visitor upon having a bad experience with a product purchase may share his/her experience on social networks and/or complain bitterly on public forums, whereas another online visitor may choose to return the product and opt for another product, while precluding socializing his/her experience. An example of a biological characteristic may correspond to gender or even age-based inclination towards consumption of products/services or information. For example, a middle-aged female may be more likely to purchase a facial product associated with aging, whereas a middle-aged man may be more likely to purchase a hair care related product. It is understood that examples of online visitors' biological, sociological and psychological characteristics are provided herein for illustrative purposes and may not be considered limiting the scope of set of behavioral traits associated with a persona type and that each persona type may include one or more such behavioral traits. The extraction of the plurality of persona related attributes related to an online visitor from a textual transcript of each interaction is explained hereinafter.

Each textual transcript includes a plurality of utterances exchanged between an agent and an online visitor engaged in the interaction. The term 'utterance' as used throughout the description refers to a content associated with a single 'turn' in a turn-based interaction between an agent and the online visitor. It is understood that an interaction between an agent and an online visitor may include several turns, i.e. the online visitor and the agent may take turns in conversing with each other. The content of interaction (whether in typed or spoken format) associated with a single turn (either from an agent or a visitor) is referred to herein as an utterance. Accordingly, an interaction between the agent and the online visitor may include a plurality of utterances.

In an embodiment, the processor 302 is configured to extract a plurality of utterances of the online visitor from the textual transcript of the respective interaction. The plurality of utterances corresponding to the online visitor may then be used to extract persona attributes corresponding to the respective online visitor. In one embodiment, the processor 302 is configured to perform a predefined personality trait evaluation for each extracted utterance to facilitate extraction of the plurality of persona related attributes from each interaction. For example, the predefined personality trait evaluation may include at least one of big-five personality factors based evaluation and thirty personality related facets based evaluation. The personality trait evaluation based on big-five personality factors is explained hereinafter. For purposes of description, the term 'online visitor' is interchangeably referred to as 'visitor' hereinafter.

In one example embodiment, each utterance of the visitor is subjected to big-five personality factors based evaluation. It is noted that the big five personality factors are (1) Openness, (2) Conscientiousness, (3) Extroversion, (4) Agreeableness and (5) Neuroticism. Evaluating personality factors or traits of an online visitor based on the big-five model enables a measurement of how individuals interact with their surroundings. An attribute may be extracted corresponding to a measurement of an online visitor's personality for each personality factor from among the big-five personality factors.

In an illustrative example, the processor 302 may be configured to classify each visitor utterance in an interaction as indicative of one of the big-five personality factors and rate them on a scale, for example on a linear scale of '1' to '5', with '1' being least relevant and '5' being most relevant. For example, an utterance 'Yes, I would like to try out the new offer on wireless headphones' may be classified as being related to personality factor 'Openness' (i.e. the visitor is open to new experiences) and the utterance may be rated as '5' on the scale of 1-5 for the personality factor: 'Openness'. Similarly, another utterance 'I have called several times with no assistance from your side. Are you guys serious in assisting people who have bought your product?' may be classified as being related to personality factor 'Neuroticism' (as the visitor seems to be in an angry or frustrated mood, i.e. not emotionally stable) and the utterance may be rated as '3' on the scale of 1-5 for the personality factor: 'Neuroticism'. Accordingly, each visitor utterance may be classified and rated as per a big-five personality factor. For example, visitor utterance numbers 1 and 5 (i.e. the first and the fifth utterance) in an interaction may be rated for personality trait 'Extroversion', whereas, utterance numbers 2 and 9 (i.e. the second and ninth utterances) in a conversation may be rated for personality factor 'Agreeableness' and so on and so forth.

The ratings for individual utterances corresponding to each personality factor may then be combined to arrive at a score for each personality trait. For example, if visitor utterances 3, 7 and 8 in a conversation are rated for big-five personality factor 'Conscientiousness', and, the individual utterances are associated with rating 3, 4 and 5, respectively, then the score for the personality trait 'Conscientiousness' may be computed as a sum of the ratings for the three utterances, i.e. the score will be 3+4+5=12. It is noted that some utterances may have a negative connotation of a particular personality trait, then such an utterance may be rated on a reversed rating scale (with 5 being least relevant and 1 being most relevant) and the rating may be associated with a negative sign (i.e. the rating will be subtracted while computing the overall score). More specifically, if an utterance has a rating of '4' on the reversed rating scale on account of having an opposite connotation to a personality factor, then during computation of the score for the personality factor, this rating may be subtracted during combination of the ratings for computing the score corresponding to the personality factor. In an embodiment, the scores for each of the big-five personality factors may be utilized as attributes for use in generation of a feature vector data representation. In the simplest form, if a big-five personality factor score is above a predefined threshold say '50', then the attribute may be represented by a binary '1', else, it may be represented by '0'. It is noted that the binary representation is mentioned herein for illustration purposes and that the big-five personality factor scores may be represented in any form (for example, a vector representation of predefined length) to configure a persona related attribute for a respective online visitor.

Additionally, there are 30 personality related facets for which an evaluation of each visitor may be performed. These thirty facets relate to Imagination, Artistic interests, Depth of emotions, Willingness to experiment, Intellectual curiosity, Tolerance for diversity, Sense of competence, Orderliness, Sense of responsibility, Achievement striving, Self-discipline, Deliberateness, Warmth, Gregariousness, Assertiveness, Activity, Level of excitement-seeking, Positive emotions, Trust in others, Sincerity, Altruism, Compliance, Modesty, Sympathy, Anxiety, Angry Hostility, Moodiness/Contentment, Self-consciousness, Self-indulgence and Sensitivity to stress. Optionally, there may be additional attributes defined for 'Needs and Values'.

In one embodiment, an attribute may be extracted corresponding to a measurement of a visitor's personality for each facet from among the 30 personality related facets listed above. Accordingly, in addition to five attributes configured based on the visitor's big-five personality factors, thirty attributes may be configured corresponding to the measurement of a visitor's personality for each facet from among the thirty personality related facets.

In at least one example embodiment, the processor 302 in conjunction with the instructions in the memory 304, is configured to generate a feature vector data representation based, at least in part, on the plurality of persona related attributes extracted from each interaction. A feature vector data representation may correspond to a vector representation of predefined length (for example, 200 or 300 length). Since a feature vector data representation is generated based on the plurality of persona related attributes extracted from each interaction, each feature vector data representation may be representative of the persona of an online visitor. In other words, each feature vector data representation may correspond to an online visitor, who has engaged in an interaction with agent.

As explained above, the feature vector data representation is generated, based, at least in part, on the plurality of persona related attributes extracted from each interaction. More specifically, in addition to the persona related attributes, some other attributes of the online visitor may also be considered while generating the feature vector data representation. For example, in addition to the thirty-five persona related attributes now configured, other attributes related to visitor's behavior, such as for example, how often the visitor purchases a product, whether the visitor has an inclination for buying new product, whether the visitor has an inclination to chat, what NPS/CSAT scores the visitor generally provides, and the like may be predicted/identified using text-mining algorithms and intent prediction algorithms. More specifically, Machine Learning (ML) models stored in the memory 304 may be used by the processor 302 to predict (1) Net Promoter Score (NPS)/Customer Satisfaction (CSAT) score, (2) overall satisfaction as measured by last few utterances of the visitor and (3) possibility of up-sale/cross-sale as obtained from Sales-order report and (4) probability of clicking on on-domain personalized banner for new products and (5) probability of clicking off-domain banners meant for retargeting a visitor, and the like. The score from these five ML models may be used to configure a corresponding attribute. Accordingly, a plurality of attributes corresponding to the visitor may be extracted in addition to the persona related attributes.

In one embodiment, the attributes represented as '1's or '0's may be arranged in a string form to configure a contiguous sequence of '1's and '0's totaling a predefined number (100 or 200 binary digits for example). The predefined number may be arrived at, based on the number of personality-based attributes. For example, if 100 attributes are extracted, then a feature vector data representation may be configured of '100' vector length. The processor 302 is configured to generate a feature vector data representation for each visitor, for whom persona related attributes are extracted based on the visitor's respective interaction with the agent. In an example scenario, a plurality of feature vector data representations of predefined length may be generated corresponding to the plurality of visitors.

Referring now to FIG. 4, a simplified representation of a table 400 is shown for illustrating feature vector data representations generated corresponding to the plurality of visitors, in accordance with an embodiment of the invention. The table 400 includes a plurality of columns, such as column 402, 404, 406 and 408. The column 402 includes a list of all visitors, such as visitor 1, visitor 2 and so on and so forth till visitor N, who have engaged in interactions with agents of the enterprise on online enterprise interaction channels. The columns 404, 406 to 408 represent persona related attributes (shown as ATTRIBUTE 1, ATTRIBUTE 2 to ATTRIBUTE N, respectively) extracted from the interactions in relation to the online visitors and their respective activities on the online enterprise channels. As explained with reference to FIG. 3, several persona related attributes may be extracted by performing predefined personality trait evaluation of visitor utterances. Additionally, other attributes related to visitor's behavior, such as for example, how often the visitor purchases a product, whether the visitor has an inclination for buying new product, whether the visitor has an inclination to chat, what NPS/CSAT scores the visitor generally provides, and the like may be extracted. The entries in the columns record the attribute values for the corresponding attribute for each visitor. It is noted that though binary values are shown as entries in the columns 404, 406 to 408, in at least some embodiments, each entry may correspond to a vector (or a numerical value) of fixed length. The entries in each column from 404 to 408 for each visitor configure a feature vector data representation 410 for the respective visitor. As can be seen, a plurality of feature vector data representation may be generated corresponding to a plurality of visitors.

Referring back to FIG. 3, in one embodiment, the processor 302 may be configured to facilitate defining of a plurality of persona-based clusters. In one embodiment, the optimal number of predefined persona-based clusters may be determined by maximizing a Silhouette score or observing the variation of intra-cluster distance as a function of number of clusters. Alternatively, the user of the apparatus 200 may be configured to define a plurality of persona-based clusters (i.e. a cluster for each type of persona) and provide attributes related to the cluster. The processor 302 may be configured to generate at least one cluster feature vector corresponding to each persona-based cluster based on the attributes related to the person-based clusters defined by the user. The cluster feature vector is indicative of the visitor persona representative of the respective persona-based cluster.

In at least one example embodiment, the processor 302 in conjunction with the instructions in the memory 304, is configured to cause the apparatus 200 to classify the plurality of feature vector data representations based on a plurality of persona-based clusters. It is noted that classifying the plurality of feature vector data representations based on the plurality of persona-based clusters enables classification of the plurality of online visitors into the plurality of persona-based clusters. The classification of the plurality of feature vector data representations may be performed using a clustering algorithm capable of computing a similarity or a dissimilarity measure (such as a distance metric for instance) between the cluster feature vector of each persona-based cluster and each feature vector data representation from among the plurality of feature vector data representations to classify the plurality of feature vector data representation into the plurality of persona-based clusters. Some non-limiting examples of metrics used to compare the feature vector data representation and the cluster feature vector may include distance measuring metrics like cosine similarity, Manhattan distance, Euclidean distance, optimal matching, longest common subsequence, longest common prefix, hamming distance etc. and the like. More specifically, visitors whose feature vectors are substantially close to a cluster center of a persona-based cluster may be classified (i.e. grouped) in the corresponding persona-based cluster. Accordingly, the plurality of visitors may be grouped into persona-based clusters based on the corresponding feature vector data representations capturing their respective persona. More specifically, all visitors who have similar persona are grouped into a persona-based cluster.

In at least one example embodiment, the processor 302 in conjunction with the instructions stored in the memory 304, is configured to cause the apparatus to train a learning model for each persona-based cluster by using utterances of online visitors classified into a respective persona-based cluster. More specifically, conversations related to each visitor classified in a persona-based cluster may be fetched and used to train a deep learning neural network model, such as a Recurrent Neural Network (RNN) model. In one embodiment, for each persona-based cluster, a set of textual transcripts are chosen based on (1) intent of the visitor and (2) proximity to the cluster center. Thus, interactions that are not sufficiently close to the cluster center are discarded to control quality of content used for subsequent model training. In addition, only those interactions are taken where the disposition is positive, i.e. the visitors are satisfied with the outcome and the way agents handled the conversation. Training an RNN model using interactions related to several visitors having similar persona may enable the RNN model to mimic visitor's persona, which may then be used to train conversational agents. In some embodiments, a conversational agent may be trained to interact with several RNN models to imbibe several visitor personas. Such training of conversational agents enables the conversational agents to handle a variety of requests from a plurality of visitors associated with different personas. For example, conversations related to visitors of a particular type of persona may be used to train an RNN model to predict a previous utterance or a subsequent utterance. For example, using the utterances in the interactions of the visitors classified in one type of persona-based cluster, the RNN model may be trained to predict a previous agent utterance or a subsequent agent utterance for a given visitor utterance input to the RNN model. In another illustrative example, using the utterances in the interactions of the visitors classified in one type of persona-based cluster, the RNN model may be trained to predict a previous visitor utterance or a subsequent visitor utterance for a given agent utterance input to the RNN model. Such training of the RNN models enables effective training of the conversational agents.

In one embodiment, the processor 302, subsequent to receiving a request for an agent interaction, i.e. a request for conversation with an agent of an enterprise, may use text-mining or intent prediction algorithms stored in the memory 304 to predict a persona of the visitor seeking agent interaction. As explained with reference to FIG. 3, visitor's past interactions with the enterprise and the current journey on the enterprise interaction channel may be used to predict a persona of the visitor. Subsequent to the prediction of the persona of the visitor associated with the requested agent interaction, the processor 302 may assign an automated conversational agent trained on handling interactions for that particular-persona type to engage with the visitor. As the automated conversational agent is trained for handling such persona-based interactions, the responses provided by the automated conversational agent may be more streamlined and accurate and involvement of live agents in overriding the automated conversational agent responses may be drastically reduced. In some embodiments, the RNN model is used for facilitating training of live agents in interacting with future online visitors predicted to be associated with visitor persona substantially matching the visitor persona mimicked by the learning model.

Figure 5:
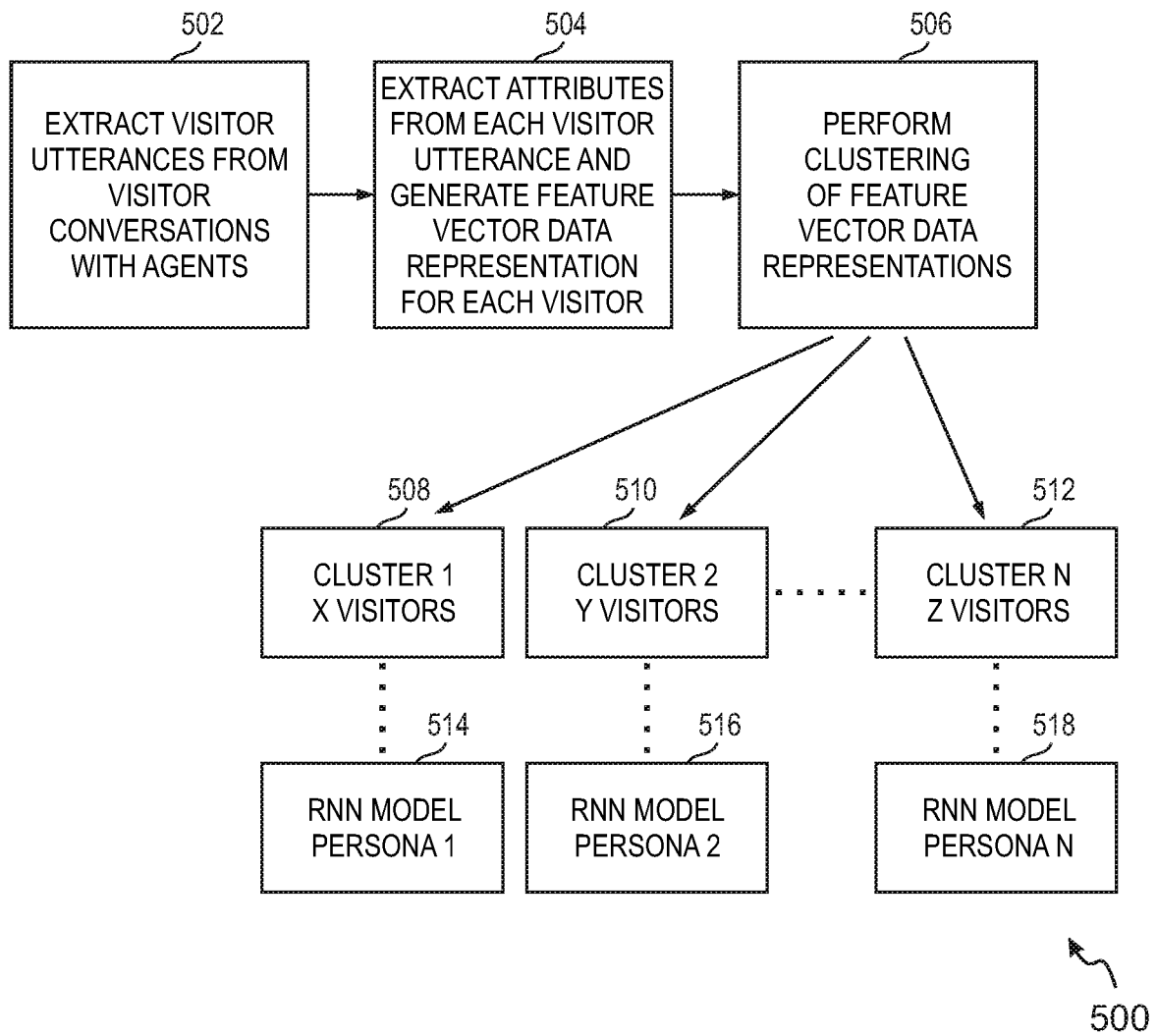
FIG. 5 shows a representation of an example process flow for facilitating persona-based training of learning models, in accordance with an embodiment of the invention.

FIG. 5 shows a representation of an example process flow 500 for facilitating persona-based training of learning models, in accordance with an embodiment of the invention. In one embodiment, the various steps of the process flow 500 may be performed by the apparatus 200 explained with reference to FIGS. 2 and 3. Alternatively, the various steps of the process flow 500 may be performed by a system capable of executing the instructions executed by a processor, such as the processor 302, for facilitating persona-based agent interactions with online visitors.

The process flow 500 is depicted to start at 502. At 502, utterances related to a plurality of visitors are extracted from respective interactions of the visitors with the conversational agents of the enterprise. For example, all visitor lines in a chat between a visitor and a human chat agent may be extracted. At 504 of the process flow 500, attributes are extracted for each visitor from the respective visitor lines and a feature vector data representation is generated corresponding to each visitor. The extraction of the attributes and the subsequent generation of the feature vector data representation may be performed as explained with reference to FIGS. 3 and 4 and is not explained again herein.

At 506 of the process flow 500, a clustering of the feature vector data representations is performed to cluster (or segregate) the plurality of visitors into a plurality of persona-based clusters. The clustering of the feature vector data representations may result in categorizing visitors into different clusters. In the FIG. 5, the clustering of the feature vector data representations is depicted to have generated cluster 508 (shown as 'Cluster 1' including 'X' visitors), cluster 510 (shown as 'Cluster 2' including 'Y' visitors) to cluster 512 (shown as 'Cluster 'N' including 'Z' visitors), where X, Y and Z are positive integers.

Further, the visitor utterances in the interactions (for example, chat conversations or voice conversations) of the visitors categorized in each persona-based cluster may be used to train a deep learning neural network (such as an RNN) to mimic a visitor persona associated with the corresponding cluster. Accordingly, as shown in FIG. 5, each persona-based cluster is associated with an RNN model implying that visitor utterances from the interactions of the visitors classified in that persona-based cluster are used to train the RNN models for a corresponding persona to facilitate mimicking behavior of the visitor associated with the same persona. Accordingly, the cluster 508 is depicted to be associated with an RNN model 514 for training of a learning model to mimic 'persona 1', the cluster 510 is depicted to be associated with an RNN model 516 for training of a learning model to mimic 'persona 2', and the cluster 512 is depicted to be associated with an RNN model 518 for training of a learning model to mimic 'persona N'.

The training of learning models using utterances of visitors extracted from interactions is explained hereinafter.

Figure 6:
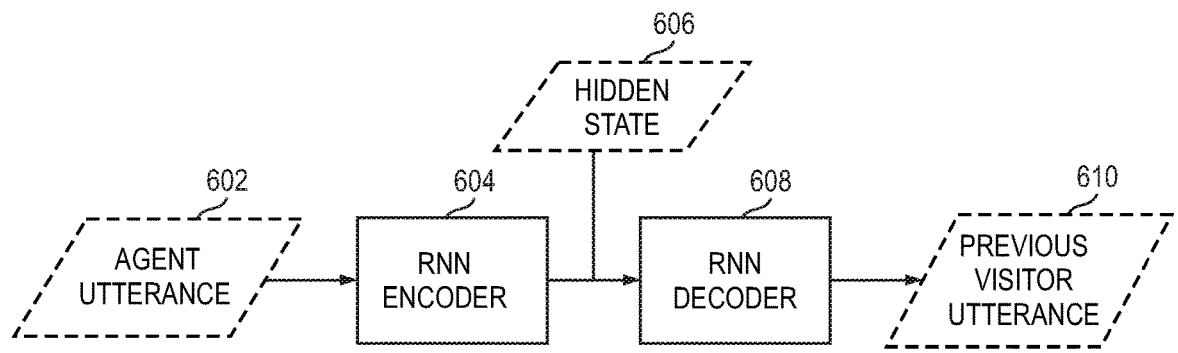
FIGS. 6, 7 and 8 depict block diagrams for illustrating an example training of the learning models, in accordance with an embodiment of the invention.
Figure 7:
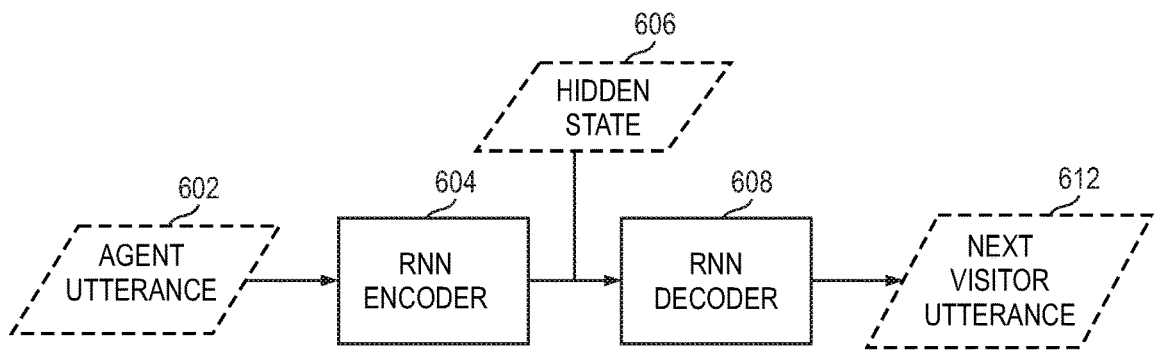
Figure 8:
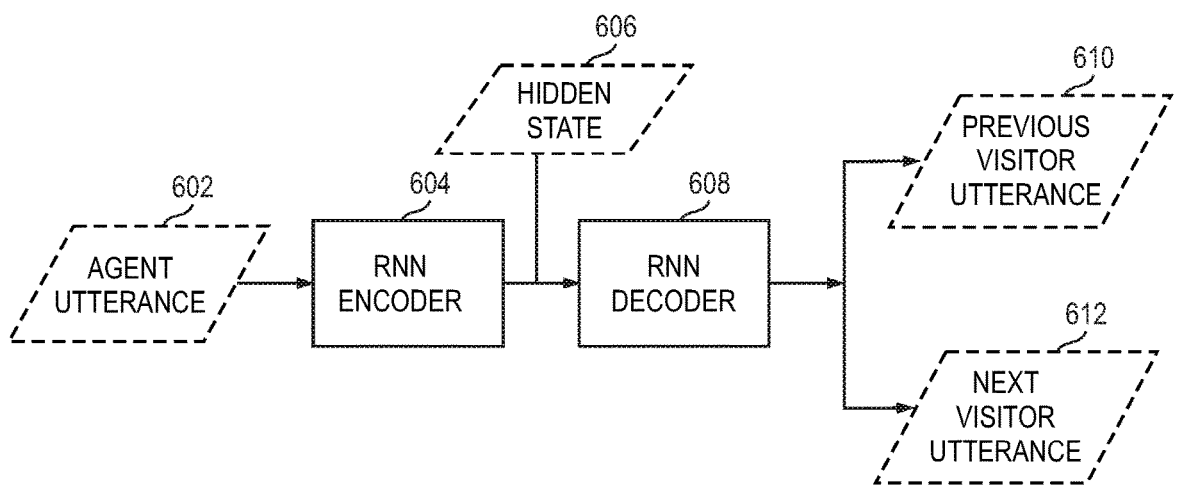

Referring now to FIGS. 6, 7 and 8, block diagrams are depicted to illustrate an example training of the learning models, in accordance with an embodiment of the invention. More specifically, FIG. 6 depicts a providing of an agent utterance 602 to an RNN encoder 604 resulting in an output corresponding to the hidden state representation of the encoder, depicted as a hidden state 606. It is noted that the hidden state 606 captures the context of the agent utterance in the interaction. The hidden state 606 may be provided as an input to an RNN decoder 608. The RNN decoder 608 may be trained using machine learning algorithms and datasets corresponding to set of interactions with similar personas to predict a previous visitor utterance 610. As the hidden state 606 captures the context of the utterance in the interaction, the RNN decoder 608 may be trained to decode the context and predict the previous visitor utterance 610, which resulted in the agent utterance 602. Similarly, the RNN decoder 608 may be trained to predict a next visitor utterance as exemplarily depicted in FIG. 7. More specifically, upon receiving the hidden state 606 capturing the context of the agent utterance 602, the RNN decoder 608 may be trained to decode the context and predict a next visitor utterance 612. In some embodiments, the RNN decoder 608 may be trained to predict both the previous visitor utterance 610 and the next visitor utterance 612 as exemplarily depicted in FIG. 8.

It is noted that training of the RNN model may not be limited to decoding context in agent utterances. In at least some example embodiments, the RNN decoder 608 may be trained to decode the context in a hidden state representing a visitor utterance and predict the previous agent utterance that resulted in such a visitor utterance as well as the next agent utterance that may result from the providing of such a visitor utterance.

The trained model embodied as the RNN encoder 604 and the RNN decoder 608 may, in effect, configure an automated conversational agent (such as a chatbot) which can mimic a visitor associated with a known persona. The chatbots may thereafter be used to engage in conversations with live agents to train the live agents to engage with future online visitors with the known persona. It is noted that the datasets created by categorizing conversations with similar personas may also enable training of automated conversational agents in engaging with visitors. For example, a plurality of agent persona related attributes may be extracted from utterances of the agents engaged in the plurality of interactions and may be processed in a similar manner as explained with reference to persona related attributes of the visitor to train learning models, like the RNN models, to mimic the agent's persona. The trained RNN model may configure an automated conversational agent capable of handling visitor queries and providing desired assistance to the visitors. An example response to a visitor query generated by a trained chatbot, is shown in FIG. 9.

Figure 9:
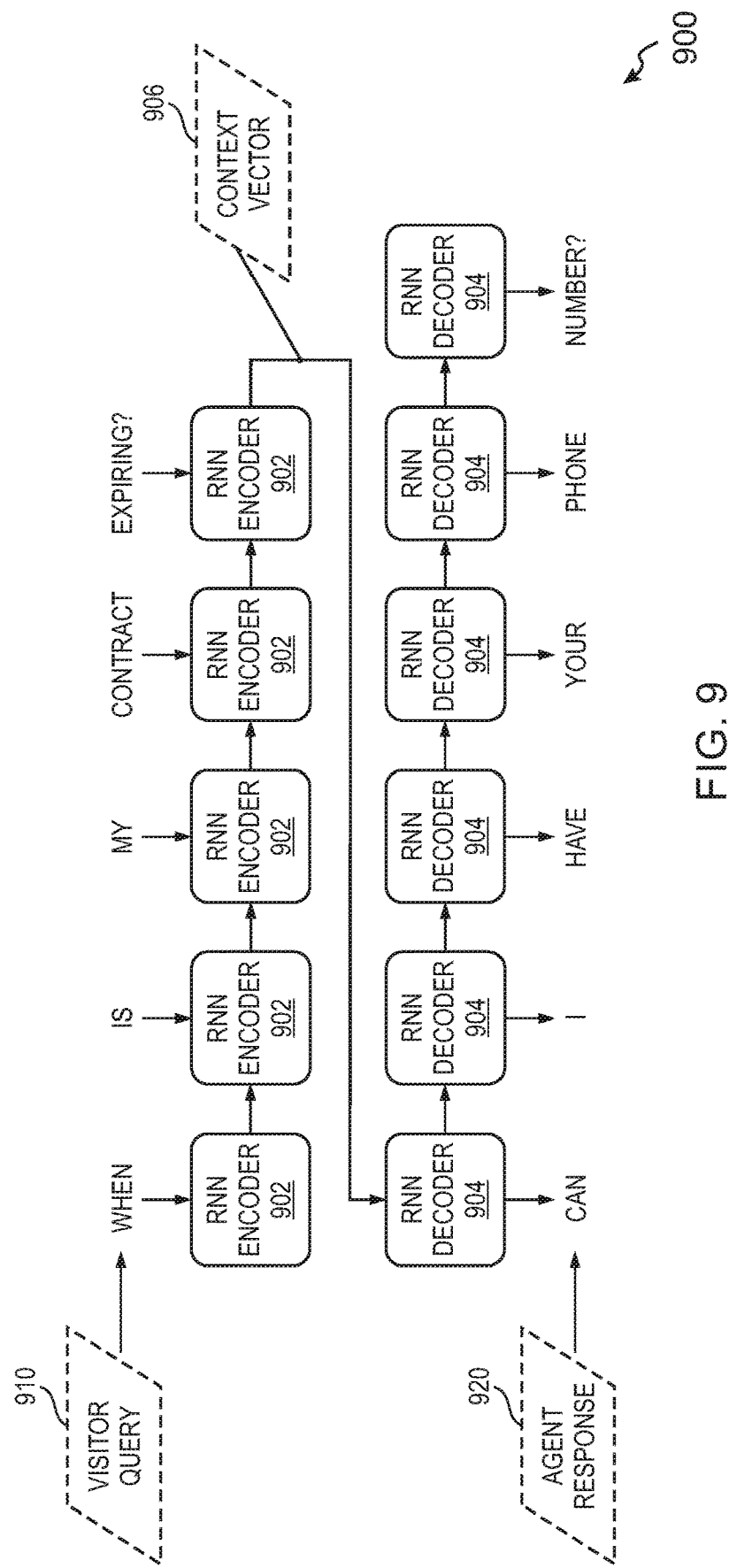
FIG. 9 shows a block diagram representation for illustrating generation of a sequential output of words configuring the conversational agent response in response to a visitor query, in accordance with an embodiment of the invention.

FIG. 9 shows a block diagram representation 900 for illustrating generation of a sequential output of words configuring the conversational agent response in response to a visitor query, in accordance with an embodiment of the invention.

As explained with reference to FIGS. 6 to 8, the processor 302 of the apparatus 200 (shown in FIG. 3) may use the set of textual transcripts of interactions associated with visitors categorized in a particular persona-based cluster to train learning model, which in turn may be used to configure automated conversational agents. More specifically, an RNN model including an encoding logic and a decoding logic may be trained using the interactions to retain context and predict utterances and thereby respond appropriately to visitor/agent utterances.

The encoding logic of the RNN model is used to encode, or in other words, generate a vector (for example, a numerical value of fixed length) for each word sequentially fed to the encoding logic, whereas the decoding logic is used to decode, or in other words, generate a word response (more specifically, a numerical vector representing a probability distribution over the vocabulary) for each word sequentially fed to the decoding logic.

The encoding logic of the RNN model is exemplarily represented using block 902, referred to hereinafter as an 'RNN Encoder 902', whereas the decoding logic is exemplarily represented using block 904, referred to hereinafter as an 'RNN Decoder 904'. As can be seen the words of a visitor query 910, i.e. words 'WREN', 'IS', 'MY', 'CONTRACT' AND 'EXPIRING' are sequentially provided to the RNN encoder 902.

It is noted that the multiple RNN encoders are shown to be arranged in a pipeline manner for illustration purposes. Only one RNN encoder 902 typically receives the words one after another. After each word passes through the RNN encoder 902, a vector is generated. The vector or the numerical value is indicative of the state of the RNN representing all words that have been provided to the RNN encoder 902 so far. The next word changes the state of the RNN, which corresponds to another vector. When all the words in the visitor query 910 are sequentially provided to the RNN encoder 902, the final output which is shown as a 'context vector 906' represents the state of the RNN encoder 902 upon being sequentially provided all the words in the visitor query 910.

As shown, the context vector 906 is then provided the RNN decoder 904, which provides a vector representation configuring the first word of the conversational agent response, shown as 'CAN'. The word is provided to the RNN decoder 904 to generate the second word 'I' and so on and so forth to generate the sequential output of words configuring a conversational agent response 920: 'CAN I HAVE YOUR PHONE NUMBER?' The response is then provided as reply to the visitor.

It is noted that the RNN model as described with reference to FIGS. 6 to 8 only predicts an agent utterance (or a visitor utterance) for a given visitor utterance (or an agent utterance) and as such, the RNN model does not take the context of the previous utterances into account for prediction of agent/visitor utterances. An example RNN model architecture capable of taking into account the context of the conversation into account is explained with reference to FIG. 10.

Figure 10:
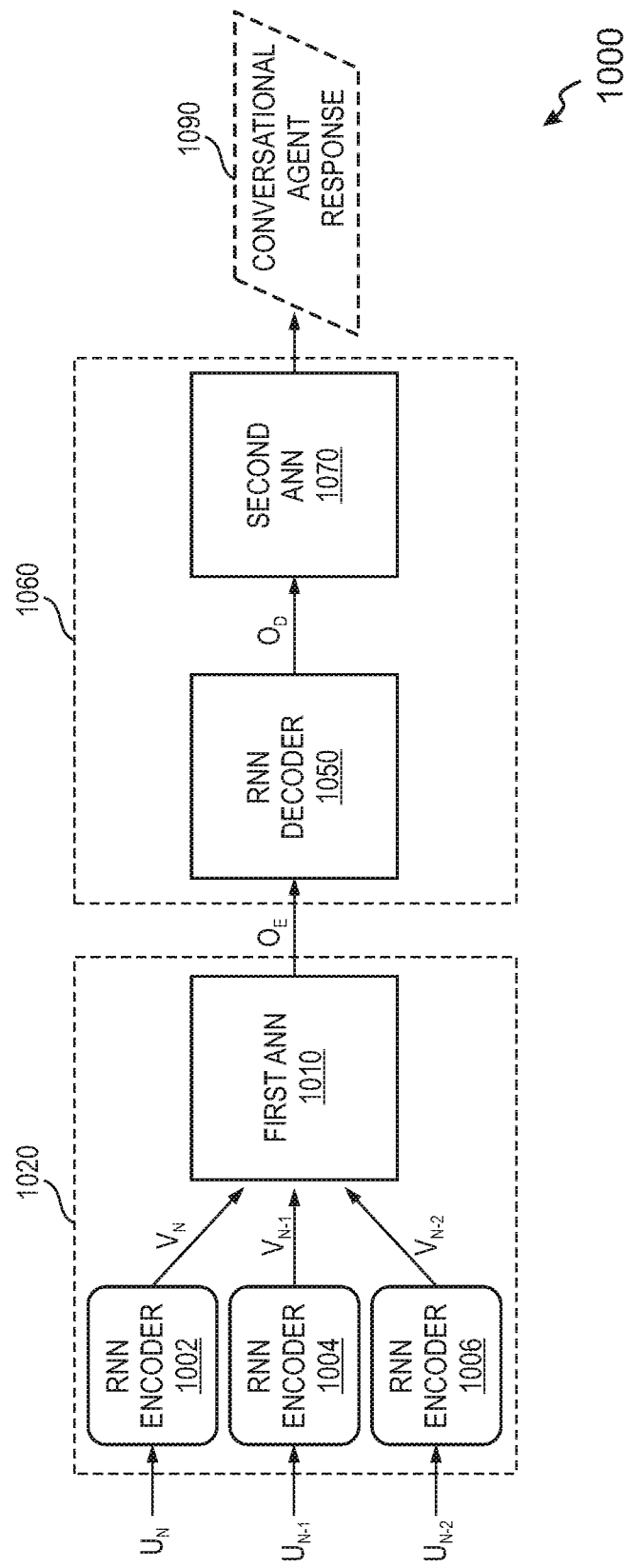
FIG. 10 shows a simplified block-diagram representation of an architecture of an RNN model for facilitating persona-based training of learning models, in accordance with an embodiment of the invention.

FIG. 10 shows a simplified block-diagram representation 1000 of an architecture of an RNN model for facilitating persona-based training of learning models, in accordance with an embodiment of the invention.

In one embodiment, the processor 302 of the apparatus 200 (shown in FIG. 3) may be configured to select two or more utterances from a conversation of a visitor classified in a particular persona-based cluster based on a width value of a moving window. The term 'moving window' as used herein implies an imaginary bounding box of fixed width capable of being slid over textual representation of a turn-based interaction to capture a fixed number of conversational lines. For example, for the width value of the moving window selected as three, three utterances in the turn-based interaction may be selected for predicting each agent/visitor utterance.

The representation 1000 depicts three utterances provided as inputs to three RNN encoders. It is noted that three RNN encoders, implying a moving window width value of three for encoding three utterances is shown herein for illustration purposes and that the number of RNN encoders may vary as per the selection of moving window width value. For example, the width value of moving window may be selected to be any number greater than 1.

Each RNN encoder (i.e. RNN encoding logic) is configured to receive one utterance as an input and generate a vector representation by encoding the utterance. As explained with reference to FIG. 9, each word in the utterance may be sequentially fed to the RNN encoder to generate a numerical value (which serves as a vector representation of the utterance). In an example embodiment, the current visitor utterance may be provided to one RNN encoder, the latest agent utterance may be provided to the second RNN encoder and the previous visitor utterance may be provided to the third RNN encoder. Accordingly, an RNN encoder 1002 is depicted to receive the current visitor utterance $U_N$, an RNN encoder 1004 is depicted to receive the latest agent utterance $U_{N-1}$ and an RNN encoder 1006 is depicted to receive the previous visitor utterance $U_{N-2}$. The vector outputs of the RNN encoders 1002, 1004 and 1006 are depicted to be $V_N$, $V_{N-1}$, and $V_{N-2}$, respectively. The vector outputs of the RNN encoders 1002-1006 are depicted to be provided to a first Artificial Neural Network (ANN) 1010 (i.e. multi-layer perceptron logic retrieved by the processor 302). The first ANN 1010 is configured to receive the outputs of the RNN encoders 1002-1006 and generate a final encoded output, depicted as $O_E$. It is noted a dotted block 1020 is shown in FIG. 10 to illustrate the encode-related processing performed by the processor 302 of the apparatus 200.

The final encoded output $O_E$ is provided to the decoding module. More specifically, the final encoded output $O_E$ is provided to an RNN decoder 1050, which is configured to generate a decoded output $O_D$. The decoded output $O_D$ is provided to a second Artificial Neural Network (ANN) 1070 configured to generate a word for each decoded output received from the RNN decoder 1050, thereby generating the words configuring a conversational agent response 1090 (such as the agent response 920 shown in FIG. 9). It is noted a dotted block 1060 is shown in FIG. 10 to illustrate the decode-related processing performed by the processor 302 of the apparatus 200.

The conversational agent response 1090 is then provided by the processor 302 to the communication module 308 (shown in FIG. 3), which is configured to forward the response to the conversational agent. The conversational agent may then provide the conversational agent response 1090 to the visitor as a reply to the visitor's query. The prediction of each word in the conversational agent response by encoding and decoding several utterances in the turn-based interaction improves a quality of responses provided to the visitor.

A method for facilitating persona-based agent interactions with online visitors is explained next with reference to FIG. 11.

Figure 11:
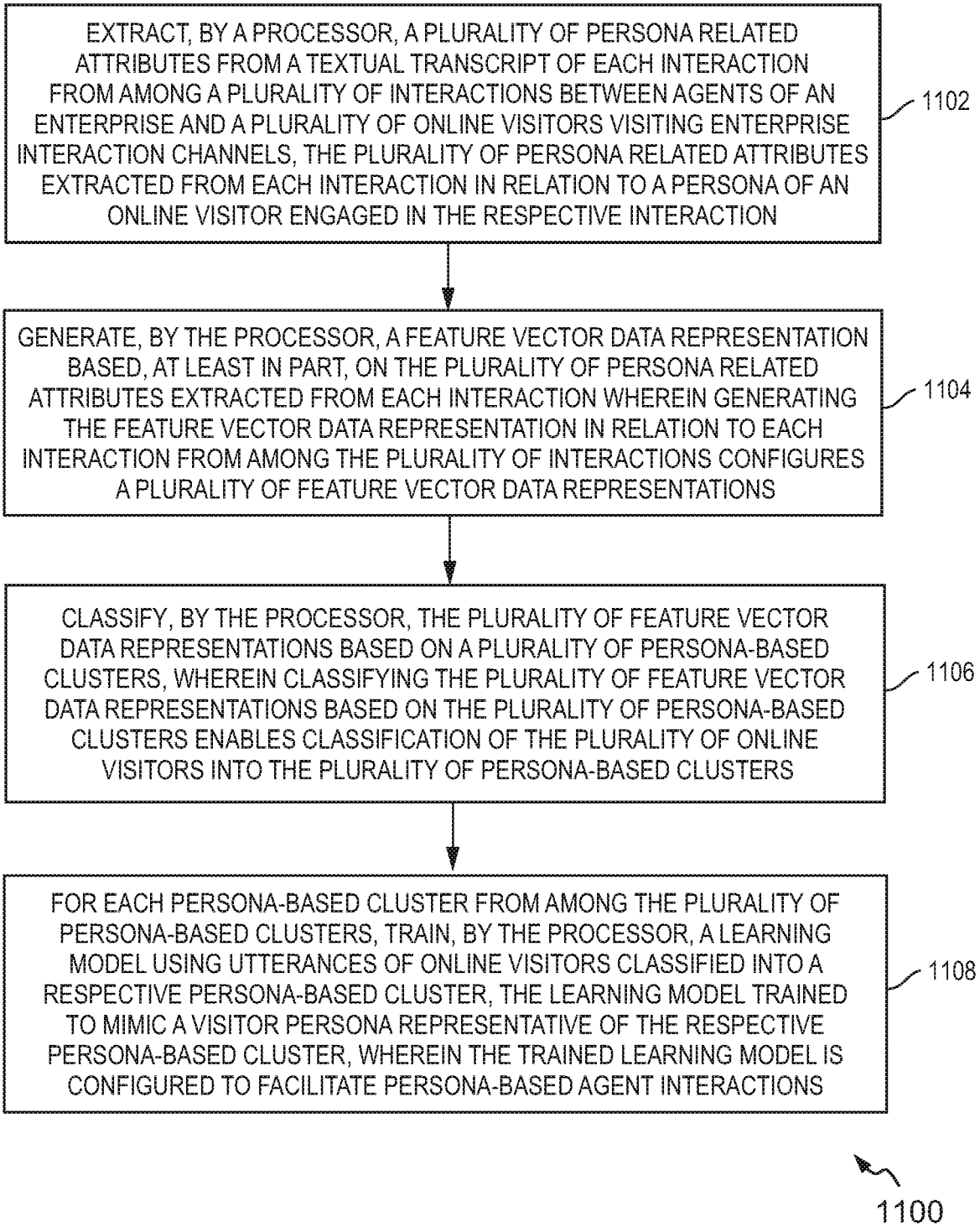
FIG. 11 shows a flow diagram of a method for facilitating persona-based agent interactions with online visitors, in accordance with an embodiment of the invention.

FIG. 11 shows a flow diagram of a method 1100 for facilitating persona-based agent interactions with online visitors, in accordance with an embodiment of the invention. The method 1100 depicted in the flow diagram may be executed by, for example, the apparatus 200 explained with reference to FIGS. 2 to 10. Operations of the flowchart, and combinations of operation in the flowchart, may be implemented by, for example, hardware, firmware, a processor, circuitry and/or a different device associated with the execution of software that includes one or more computer program instructions. The operations of the method 1100 are described herein with help of the apparatus 200. It is noted that, the operations of the method 1100 can be described and/or practiced by using any system other than the apparatus 200. The method 1100 starts at operation 1102.

At operation 1102 of the method 1100, a plurality of persona related attributes are extracted from a textual transcript of each interaction from among a plurality of interactions between agents of an enterprise and a plurality of online visitors visiting enterprise interaction channels. The plurality of persona related attributes is extracted from each interaction, by a processor such as the processor 302 explained with reference to FIGS. 3 to 10, in relation to a persona of an online visitor engaged in the respective interaction.

In one embodiment, a plurality of textual transcripts are generated corresponding to a plurality of interactions between agents and online visitors of an enterprise. The content of textual chat interaction configures a textual transcript corresponding to the respective interaction, whereas for voice interactions, the recorded content is converted into a textual form using Automatic Speech Recognition (ASR) and Natural Language Processing (NLP) techniques using special grammar to configure a textual transcript corresponding to the respective interaction. A plurality of persona related attributes is extracted from a textual transcript of each interaction. The term 'persona' refers to characteristics reflecting behavioral patterns, goals, motives and personal values of the online visitor and is explained with reference to FIG. 3.

Each textual transcript includes a plurality of utterances exchanged between an agent and an online visitor engaged in the interaction. In an embodiment, a plurality of utterances of the online visitor are extracted from the textual transcript of the respective interaction. The plurality of utterances corresponding to the online visitor are then used to extract persona attributes corresponding to the respective online visitor. In one embodiment, a predefined personality trait evaluation is performed for each extracted utterance to facilitate extraction of the plurality of persona related attributes from each interaction. For example, the predefined personality trait evaluation may include at least one of big-five personality factors based evaluation and thirty personality related facets based evaluation. The personality trait evaluation based on big-five personality factors based evaluation and thirty personality related facets is explained with reference to FIG. 3 and is not explained again herein. In one embodiment, an attribute is extracted corresponding to a measurement of a visitor's personality for each trait to configure a plurality of persona related attributes.

At operation 1104 of the method 1100, a feature vector data representation is generated by the processor based, at least in part, on the plurality of persona related attributes extracted from each interaction. More specifically, in addition to the persona related attributes, some other attributes of the online visitor may also be considered while generating the feature vector data representation. For example, in addition to the thirty-five persona related attributes now configured, other attributes related to visitor's behavior, such as for example, how often the visitor purchases a product, whether the visitor has an inclination for buying new product, whether the visitor has an inclination to chat, what NPS/CSAT scores the visitor generally provides, and the like may be predicted/identified using text-mining algorithms and intent prediction algorithms. More specifically, Machine Learning (ML) models stored in the memory 304 may be used by the processor 302 to predict (1) Net Promoter Score (NPS)/Customer Satisfaction (CSAT) score, (2) overall satisfaction as measured by last few lines of visitor and (3) possibility of up-sale/cross-sale as obtained from Sales-order report and (4) probability of clicking on on-domain personalized banner for new products and (5) probability of clicking off-domain banners meant for retargeting a visitor, and the like. The score from these five ML models may be used to configure a corresponding attribute. Accordingly, a plurality of attributes corresponding to the visitor may be extracted in addition to the persona related attributes.

In one embodiment, the attributes represented as '1's or '0's may be arranged in a string form to configure a contiguous sequence of '1's and '0's totaling a predefined number (100 or 200 binary digits for example). The predefined number may be arrived at, based on the number of personality-based attributes. For example, if 100 attributes are extracted, then a feature vector data representation may be configured of '100' vector length. The processor is configured to generate a feature vector data representation for each visitor, for whom persona related attributes are extracted based on their respective interactions with the agents. In an example scenario, a plurality of feature vector data representations of predefined length may be generated corresponding to the plurality of visitors. The generation of the feature vector data representation may be performed as explained with reference to FIG. 4 and is not explained again herein.

At operation 1106 of the method 1100, the plurality of feature vector data representations are classified based on a plurality of persona-based clusters. The classification of the plurality of feature vector data representations based on the plurality of persona-based clusters enables classification of the plurality of online visitors into the plurality of persona-based clusters. The classification of the plurality of feature vector data representations may be performed using a clustering algorithm capable of computing a similarity or a dissimilarity measure (such as a distance metric for instance) between the cluster feature vector of each persona-based cluster and individual feature vector data representation from among the plurality of feature vector data representations to classify the plurality of feature vectors into the plurality of persona-based clusters. Some non-limiting examples of metrics used to compare the feature vectors may include distance measuring metrics like cosine similarity, Manhattan distance, Euclidean distance, optimal matching, longest common subsequence, longest common prefix, hamming distance etc. and the like. More specifically, visitors whose feature vectors are substantially close to a cluster center of a persona-based cluster may be classified (i.e. grouped) in the corresponding persona-based cluster. Accordingly, the plurality of visitors may be grouped into persona-based clusters based on the corresponding feature vector data representations capturing their respective persona. More specifically, all visitors who have similar persona are grouped into a persona-based cluster.

At operation 1108 of the method 1100, a learning model is trained for each persona-based cluster by the processor by using utterances of online visitors classified into a respective persona-based cluster. The learning model is trained to mimic a visitor persona representative of the respective persona-based cluster. More specifically, interactions related to each visitor classified in a persona-based cluster may be fetched and used to train a deep learning neural network model, such as a Recurrent Neural Network (RNN) model. In one embodiment, for each persona-based cluster, a set of textual transcripts are chosen based on (1) intent of the visitor and (2) proximity to the cluster center. Thus, interactions that are not sufficiently close to the cluster center are discarded to control quality of content used for subsequent model training. In addition, only those interactions are taken where the disposition is positive, i.e., the visitors are satisfied with the outcome and the way agents handled the conversation. Training an RNN model using interactions related to several visitors having similar persona may enable the RNN model to mimic visitor's persona, which may then be used to train conversational agents.

In one embodiment, subsequent to receiving a request for an agent interaction, i.e. a request for conversation with an agent of an enterprise, the processor may use text-mining or intent prediction algorithms to predict a persona of the visitor seeking agent interaction. As explained with reference to FIG. 3, visitor's past interactions with the enterprise and the current journey on the enterprise interaction channel may be used to predict a persona of the visitor. Subsequent to the prediction of the persona of the visitor associated with the requested agent interaction, the processor may assign an automated conversational agent trained on handling interactions for that particular-persona type to engage with the visitor. As the automated conversational agent is trained for handling such persona-based interactions, the responses provided by the automated conversational agent may be more streamlined and accurate and involvement of live agents in overriding the automated conversational agent responses may be drastically reduced. In some embodiments, the RNN model is used for facilitating training of live agents in interacting with future online visitors predicted to be associated with visitor persona substantially matching the visitor persona mimicked by the learning model.

Various embodiments disclosed herein provide numerous advantages. The techniques disclosed herein suggest techniques for training of conversational agents to enable the conversational agents to handle visitor interactions involving various visitor personas. The models are trained to incorporate persona in automated conversational agents. Incorporating persona in automated conversational agents may be beneficial in two different ways. An automated conversational agent mimicking visitors' persona may be used for live agent training since different visitors have different personalities and even for similar issues can react differently, while chatting with live agents. For example, some visitors may be lenient and patient while some visitors can be highly demanding. Persona-based agent training will equip live agents to handle online visitors in an efficient manner. Similarly, a live agent's persona may be incorporated in an automated conversational agent and such a trained automated conversational agent may be used for greater compatibility while conversing with a visitor with known personality traits.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200 and its various components such as the processor 302, the memory 304, the I/O module 306, the communication module 308, the centralized circuit system 310 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 8 and 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for facilitating persona-based agent interactions, the method comprising:
   extracting, by a processor, a plurality of persona related attributes comprising characteristics reflecting behavioral patterns, goals, motives, and personal values of an online visitor from a textual transcript of each interaction from among a plurality of interactions between agents of an enterprise and a plurality of online visitors visiting enterprise interaction channels, the plurality of persona related attributes extracted from each interaction in relation to a persona of an online visitor engaged in the respective interaction;
   generating, by the processor, a feature vector data representation based, at least in part, on the plurality of persona related attributes extracted from each interaction, wherein generating the feature vector data representation in relation to each interaction from among the plurality of interactions configures a plurality of feature vector data representations;
   classifying, by the processor, the plurality of feature vector data representations based on a plurality of persona-based clusters, wherein classifying the plurality of feature vector data representations based on the plurality of persona-based clusters enables classification of the plurality of online visitors into the plurality of persona-based dusters; and
   for each persona-based duster from among the plurality of persona-based dusters, training, by the processor, a learning model using utterances of online visitors classified into a respective persona-based duster, the learning model trained to mimic a visitor persona representative of the respective persona-based cluster, wherein the trained learning model is configured to facilitate the persona-based agent interactions.

2. The method of claim 1, further comprising performing, by the processor, for each interaction:
   extracting a plurality of utterances of the online visitor from the textual transcript of the respective interaction; and
   for each utterance from among the plurality of utterances, performing a predefined personality trait evaluation to facilitate extraction of the plurality of persona related attributes from each interaction.

3. The method of claim 1, wherein the predefined personality trait evaluation comprises at least one of big-five personality factors based evaluation and thirty personality related facets based evaluation.

4. The method of claim 1, wherein each persona-based cluster is associated with a cluster feature vector indicative of the visitor persona representative of the respective persona-based cluster, and wherein a clustering algorithm is configured to determine a similarity measure between the cluster feature vector of each persona-based cluster and each feature vector data representation from among the plurality of feature vector data representations to classify the plurality of feature vector data representations into the plurality of persona-based clusters.

5. The method of claim 1, wherein the learning model corresponds to a Recurrent Neural Network (RNN) based deep learning model.

6. The method of claim 1, wherein the trained learning model is configured to learn a representation of an utterance as a context and provide at least one of a previous utterance and a subsequent utterance as a response.

7. The method of claim 1, wherein the learning model trained to mimic the visitor persona configures an automated conversational agent incorporating the visitor persona and, wherein the automated conversational agent is used for facilitating training of live agents in interacting with future online visitors associated with visitor persona substantially matching the visitor persona incorporated in the automated conversational agent.

8. The method of claim 1, further comprising:
extracting, by the processor, a plurality of agent persona related attributes from utterances of the agents engaged in the plurality of interactions; and
training, by the processor, at least one automated conversational agent to interact with future online visitors based on the extracted plurality of agent persona related attributes.

9. The method of claim 1, wherein the plurality of interactions comprises voice interactions and textual chat interactions between the agents and the plurality of online visitors of the enterprise.

10. The method of claim 9, further comprising:
generating, by the processor, textual representations of the voice interactions using at least one processing technique from among Natural Language Processing (NLP) and Automatic Speech Recognition (ASR).

11. The method of claim 10, wherein each textual chat interaction and each textual representation of the voice interaction configures a textual transcript corresponding to the respective interaction.

12. An apparatus for facilitating persona-based agent interactions, the apparatus comprising:
a memory for storing instructions; and
a processor configured to execute the instructions and thereby cause the apparatus to at least perform:
extract a plurality of persona related attributes comprising characteristics reflecting behavioral patterns, goals, motives, and personal values of an online visitor from a textual transcript of each interaction from among a plurality of interactions between agents of an enterprise and a plurality of online visitors visiting enterprise interaction channels, the plurality of persona related attributes extracted from each interaction in relation to a persona of an online visitor engaged in the respective interaction;
generate a feature vector data representation based, at least in part, on the plurality of persona related attributes extracted from each interaction, wherein generating the feature vector data representation in relation to each interaction from among the plurality of interactions configures a plurality of feature vector data representations;
classify the plurality of feature vector data representations based on a plurality of persona-based clusters, wherein classifying the plurality of feature vector data representations based on the plurality of persona-based clusters enables classification of the plurality of online visitors into the plurality of persona-based clusters; and
for each persona-based cluster from among the plurality of persona-based clusters, train a learning model using utterances of online visitors classified into a respective persona-based cluster, the learning model trained to mimic a visitor persona representative of the respective persona-based cluster, wherein the trained learning model is configured to facilitate the persona-based agent interactions.

13. The apparatus of claim 12, wherein the apparatus is further caused to perform for each interaction:
extract a plurality of utterances of the online visitor from the textual transcript of the respective interaction; and
for each utterance from among the plurality of utterances, perform a predefined personality trait evaluation to facilitate extraction of the plurality of persona related attributes from each interaction, wherein the predefined personality trait evaluation comprises at least one of big-five personality factors based evaluation and thirty personality related facets based evaluation.

14. The apparatus of claim 12, wherein each persona-based cluster is associated with a cluster feature vector indicative of the visitor persona representative of the respective persona-based cluster, and wherein a clustering algorithm is configured to determine a similarity measure between the cluster feature vector of each persona-based cluster and each feature vector data representation from among the plurality of feature vector data representations to classify the plurality of feature vector data representations into the plurality of persona-based clusters.

15. The apparatus of claim 12, wherein the trained learning model is configured to learn a representation of an utterance as a context and provide at least one of a previous utterance and a subsequent utterance as a response.

16. The apparatus of claim 12, wherein the learning model is used for facilitating training of live agents in interacting with future online visitors predicted to be associated with visitor persona substantially matching the visitor persona mimicked by the learning model.

17. The apparatus of claim 12, wherein the learning model trained to mimic the visitor persona configures an automated conversational agent incorporating the visitor persona and, wherein the automated conversational agent is used for facilitating training of live agents in interacting with future online visitors associated with visitor persona substantially matching the visitor persona incorporated in the automated conversational agent.

18. A computer-implemented method for facilitating persona-based agent interactions, the method comprising:
performing, by a processor, for each interaction from among a plurality of interactions between agents of an enterprise and a plurality of online visitors visiting enterprise interaction channels:
extract a plurality of utterances of an online visitor from a textual transcript of a respective interaction, and
for each utterance from among the plurality of utterances, perform a predefined personality trait evaluation to extract a plurality of persona related attributes comprising characteristics reflecting behavioral patterns goals, motives, and personal values of an online visitor, wherein the plurality of persona related attributes are extracted from each interaction in relation to a persona of the online visitor engaged in the respective interaction;

generating, by the processor, a feature vector data representation based, at least in part, on the plurality of persona related attributes extracted from each interaction, wherein generating the feature vector data representation in relation to each interaction from among the plurality of interactions configures a plurality of feature vector data representations;

classifying, by the processor, the plurality of feature vector data representations based on a plurality of persona-based clusters, wherein classifying the plurality of feature vector data representations based on the plurality of persona-based clusters enables classification of the plurality of online visitors into the plurality of persona-based clusters; and for each persona-based cluster from among the plurality of persona-based clusters, training, by the processor, a Recurrent Neural Network (RNN) model using utterances of online visitors classified into a respective persona-based cluster, the RNN model trained to mimic a visitor persona representative of the respective persona-based cluster, wherein the trained learning model is configured to facilitate the persona-based agent interactions.

19. The method of claim 18, wherein each persona-based cluster is associated with a cluster feature vector indicative of the visitor persona representative of the respective persona-based cluster, and wherein a clustering algorithm is configured to determine a similarity measure between the cluster feature vector of each persona-based cluster and each feature vector data representation from among the plurality of feature vectors to classify the plurality of feature vectors into the plurality of persona-based clusters.

20. The method of claim 18, wherein the RNN model trained to mimic the visitor persona configures an automated conversational agent incorporating the visitor persona and, wherein the automated conversational agent is used for facilitating training of live agents in interacting with future online visitors associated with visitor persona substantially matching the visitor persona incorporated in the automated conversational agent.

* * * * *